United States Patent [19]
Hess et al.

[11] 3,877,814
[45] Apr. 15, 1975

[54] METHOD OF AND APPARATUS FOR DETECTING CONCAVE AND CONVEX PORTIONS IN A SPECULAR SURFACE

[75] Inventors: Daniel J. Hess, Cumberland, Md.; Robert J. Obenreder, Corapopolis, Pa.

[73] Assignee: PPG Industries, Inc., Pittsburgh, Pa.

[22] Filed: Feb. 7, 1973

[21] Appl. No.: 330,369

[52] U.S. Cl. ............... 356/120; 356/200; 356/209
[51] Int. Cl. ............................................ G01n 21/32
[58] Field of Search ........... 356/120, 167, 209, 239, 356/237; 350/276, 296; 250/237

[56] References Cited
UNITED STATES PATENTS

| | | | |
|---|---|---|---|
| 2,215,211 | 9/1940 | Devol | 250/237 X |
| 2,869,416 | 1/1959 | Nieman et al. | 356/209 X |
| 3,039,349 | 6/1962 | Rodgers | 350/276 R |
| 3,549,896 | 9/1970 | Masino | 350/296 X |

OTHER PUBLICATIONS
Jenkins et al., Fundamentals of Optics, 1950, second edition, McGraw-Hill, pp. 560–564.

*Primary Examiner*—Ronald L. Wibert
*Assistant Examiner*—Matthew W. Koren
*Attorney, Agent, or Firm*—Donald Carl Lepiane

[57] ABSTRACT

A method of and apparatus for detecting concave and convex portions in a surface of a glass ribbon are disclosed. A collimated beam of light is directed toward a top surface of the glass ribbon at a preselected angle of incidence to minimize reflections from the bottom surface. A photo sensing detector is displaced across the glass ribbon along the path of the collimated beam to sense changes in intensity of reflected beams from the top surface. Concave and convex portions in the top surface increase and decrease the intensity of the reflected beams, respectively, as compared to beams reflected from flat portions on the surface. By observing the intensity of the reflected beams, concave and convex portions in the surface can be determined.

5 Claims, 4 Drawing Figures

METHOD OF AND APPARATUS FOR DETECTING CONCAVE AND CONVEX PORTIONS IN A SPECULAR SURFACE

BACKGROUND OF THE INVENTION

1. Field of the Invention

This invention relates to a method of and apparatus for detecting concave and convex portions in a specular surface.

2. Description of the Prior Art

In methods of making glass by the known float process, plate process or sheet process, defects may be produced in the glass which render the glass optically imperfect. Among the imperfections that may be produced in the process is optical distortion. Optical distortion, as the term is used herein, refers to the effects of concave and convex portions in the surface of the glass.

As is well known, convex portions in a glass surface shrink the image, and concave portions expand the image as observed in reflection. When excessive distortion is present, the distorted reflected images detract from the architectural beauty and are therefore not desirable.

U.S. Pat. No. 3,427,109 discloses a reflection apparatus for detecting pits in a glass ribbon. In general, a strip light source is focused to illuminate successive contiguous strip-shaped zones on a surface of the glass ribbon. The light reflected from the surface forms an image of the illuminated zone on the surface. The reflected light operates on facilities to produce an electrical signal indicative of the presence and size of any detected pit. The signal is analyzed to obtain an indication of the distribution of pits across the surface.

Although the apparatus is acceptable for detecting pits, i.e., concave portions in surfaces, the apparatus does not have sufficient sensitivity for detecting pits in moving glass ribbons produced by one of the known glass-making processes. More particularly, because the strip light is focused onto the surface, relative movement of the ribbon surface toward and away from the light source varies the intensity of the reflected light. The relative movement may be caused by varying thicknesses of glass ribbons produced by one of the known glass-making processes or by movement of ribbon out of and back into its normal plane of travel.

U.S. Pat. No. 3,355,980 similarly discloses an inspection apparatus. In general, a beam of radiant energy which is polarized so that it has an electric vector perpendicular to the plane of incidence is directed downwardly onto the top surface of a container. The top surface is scanned by the beam of radiant energy. A line-over-finish defect, e.g., a concave portion in the top surface, will reflect the light upwardly into the line of vision of a radiant energy sensitive device which energizes a reject mechanism.

Although the apparatus is acceptable as an inspection device, it is not designed to determine the nature of surface curvature of the top surface, i.e., concave or convex portions in the top surface, and the amplitude of the curvature.

In U.S. Pat. Application Ser. No. 322,574, filed on Jan. 10, 1973, in the name of R. J. Obenreder and entitled SURFACE DISTORTION ANALYZER, assigned to the assignee of this invention, there is disclosed an apparatus for and method of determining concave and convex portions in a specular surface. A beam of light is directed onto the specular surface and reflected away from the surface onto a position sensing detector. Concave and convex portions displace the reflected beam along the surface of the detector.

The Surface Distortion Analyzer is ideally suitable for inspecting samples cut from a glass ribbon but is too sensitive to be employed as an on-line inspection device. More particularly, surface displacement of the specular surface toward and away from the detector when the traveling ribbon moves out of and back into the normal plane of ribbon travel displaces the reflected beam along the surface of the detector.

Accordingly, it would be advantageous to provide an apparatus for and method of sensing optical distortions in glass ribbons produced by one of the known glass-making processes that does not have the limitation found in the prior art.

SUMMARY OF THE INVENTION

This invention relates to a method of sensing concave and convex portions in a specular surface, including the steps of directing a collimated beam of light onto the specular surface to reflect beams of light from the surface, and imparting relative motion between the surface and photo sensing facilities to measure intensity of the reflected beams along a scan path. The flat portions of the specular surface reflect collimated beams, whereas concave and convex portions converge and diverge the reflected beams, respectively.

This invention also relates to an apparatus for sensing convex or concave portions in a specular surface. Facilities are provided for directing the collimated beam of light across the specular surface. Facilities are provided to impart relative motion between photo sensing facilities and the surface to monitor the intensity of the reflected beams of light from the specular surface along a scan path.

As can be appreciated, flat specular surfaces reflect collimated incident beams aas collimated beams and movement of the surface toward or away from a light source does not affect the intensity of the reflected beams.

The intensity of the reflected beams is varied by concave and convex portions in the surface. Concave portions in the surface converge the reflected beams toward a focal point, thereby increasing the intensity of the reflected beams. Convex portions, on the other hand, diverge the reflected beams, thereby decreasing the intensity of the reflected beams. By measuring the intensity of reflected beams from the specular surface, concave and convex portions can be determined.

To determine concave and convex portions in a top surface of a glass ribbon, the reflection from the opposite or bottom surface must be minimized. This is desirable so that variations in intensity of the reflected beams are caused by the concave and convex portions in the top surface and not by defects in the glass or surface distortion of the bottom surface. By selecting an angle of incidence which is a function of glass composition and thickness, it is possible to maintain the intensity of the reflected beams from the bottom surface at an acceptable level. It has been found that when the ratio of the fraction of incident energy transmitted through the glass and reflected from the bottom surface through the top surface to the fraction of energy reflected from the top surface is equal to or less than about 0.21, the intensity of the beams reflected from the bottom surface are sufficiently minimized.

DETAILED DESCRIPTION OF THE INVENTION

Figure 3:
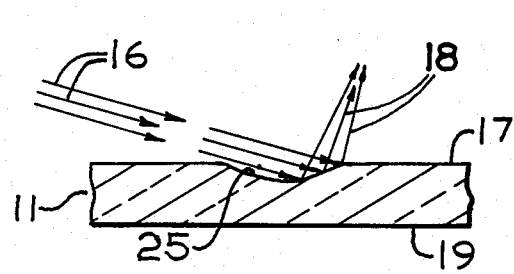
FIG. 3 is an illustration showing reflecting beams of light from a concave portion in a top surface of the glass ribbon converging toward a focal point.
Figure 4:
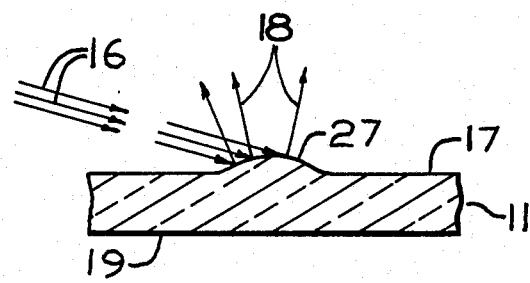
FIG. 4 is an illustration showing reflected beams of light from a convex portion in the top surface of the glass ribbon diverging away from a focal point.

In general, the method of this invention is practiced by directing a collimated beam of light across a specular surface and sensing the intensity of the reflected beams of light. Reflected beams from a flat portion of the specular surface remain collimated, whereas concave and convex portions in the surface converge and diverge the reflected beams, respectively (see FIGS. 3 and 4). The reflected converging beams of light have a higher intensity than the reflected collimated beams of light and the reflected diverging beams of light have a lower intensity than the collimated reflected beams of light.

The degree of curvature can also be determined by the intensity of the reflected light. As can be appreciated, contoured portions, i.e., concave and convex portions in a surface, having different radii of curvature have different focal lengths. For example, the smaller the radius of curvature, the closer the focal point of the reflected beam to the surface, and as the radius of curvature increases, the focal point moves farther away from the surface.

Consider the effect of convex and concave portions on reflected beams. The reflected beams of light from a concave portion have a higher intensity than the reflected beams of light from convex portions. As the radius of curvature of the convex and concave portions increases, the intensity of the reflected beams from the concave portions decrease while the intensity of the reflected beams from the convex portions increase. Conversely, as the radius of curvature of convex and concave portions decreases, the intensity of the reflected beams from the concave portions increase while the intensity of the reflected beams from the convex portions decrease. However, as can be appreciated, the intensity of reflected beams from the concave portions are always greater than the intensity of reflected beams from a flat surface, i.e., collimated beams, and the intensity of reflected beams from convex portions are always less than the intensity of collimated beams.

A photo sensing detector senses the intensity of the reflected beams along a plane parallel to the specular surface and spaced a predetermined distance therefrom. The distance between the detector and the specular surface is determined by the angle of incidence of the beams and the expected range of radius of curvature of concave and convex portions. When the detector is too close to the surface, the reflected beams have not traveled a sufficient distance to converge or diverge, thereby making it difficult to sense differences in intensity of reflected beams. If the detector is positioned a distance from the surface greater than the focal point of the concave portions, the intensity and surface curvature are no longer related and ambiguous results will be attained.

Consider the following example. For an angle of incidence of 84½° and an expected radius of curvature range of concave and convex portions of 80–160 meters, the recommended distance between the detector and the surface is about 3 to 3¼ inches. If the expected radius of curvature is greater than 160 meters, the recommended distance between the detector and the surface for an angle of incidence of 84½° is greater than 3¼ inches. Conversely, if the expected radius of curvature is less than 80 meters, the recommended distance between the detector and the surface is less than 3 inches.

When the angle of incidence is greater than 84½° and the expected radius of curvature range of the convex and concave portions is 80–160 meters, it is recommended that the distance between the detector and the surface be less than 3 inches. Conversely, if the angle of incidence is less than 84½° for the same range, the distance between the detector and the surface should be greater than 3¼ inches.

In the instance where the specular surface is a top surface of a glass ribbon, it is necessary to cancel or minimize the reflected beams from the bottom surface in order that the variations in intensity of the reflected beams are caused by concave and convex portions in the top surface and not by defects in the glass or by surface deviations in the bottom surface. One method of cancelling the reflected beams from the bottom surface is to apply a light-absorbing coating, i.e., black paint, in optical contact with the bottom surface.

Another method of minimizing the intensity of the reflected beams from the bottom surface is to select an angle of incidence such that the fraction of incident energy transmitted through the glass and reflected from the bottom surface through the top surface is significantly less than the fraction of incident energy reflected directly from the top surface. It has been found that when the ratio between the fraction of incident energy transmitted through the glass and reflected from the bottom surface through the top surface and the fraction of incident energy reflected directly from the top surface is equal to or below 0.21, the intensity of the reflected beam from the bottom surface is sufficiently minimized so that the intensity of the reflected beams from the top surface strongly predominates. Therefore, variations in intensity of reflected beams is primarily caused by concave and convex portions in the top surface.

Shown below is an equation which will generate curves for glass having varying compositions and different thicknesses. The curves give angle of incidence as a function of the ratio of the fraction of incident energy transmitted through the glass and reflected from the bottom surface through the top surface ($R_2$) to the fraction of incident energy reflected directly from the top surface ($R_1$).

$$R_2/R_1 = \left(1 - 1/2\left[\frac{\sin^2(\phi-\phi')}{\sin^2(\phi+\phi')} + \frac{\tan^2(\phi-\phi')}{\tan^2(\phi+\phi')}\right]\right)^2 \, [-2At \sec \phi']$$

where:

$R_1$ is the fraction of incident energy reflected directly from the top surface;

$R_2$ is the fraction of incident energy transmitted through the glass and reflected from the bottom surface through the top surface;

$\phi$ is the angle of inidence;

$\phi'$ is the angle of refraction;

$A$ is the absorption coefficient of the glass; and $t$ is the thickness of the glass.

Curves for selected glass types and thicknesses can be generated using the equation, and the angle of incidence can be determined to give an $R_2/R_1$ of 0.21 or less.

Figure 1:
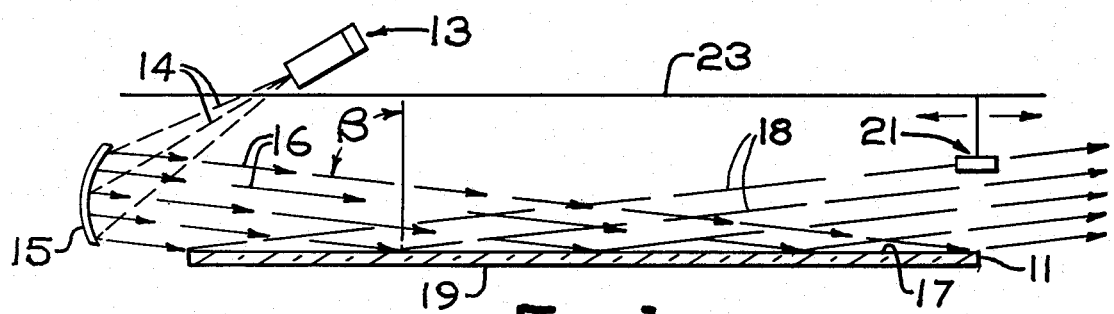
FIG. 1 is a front elevated view of an apparatus for practicing the method of this invention on a glass ribbon.
Figure 2:
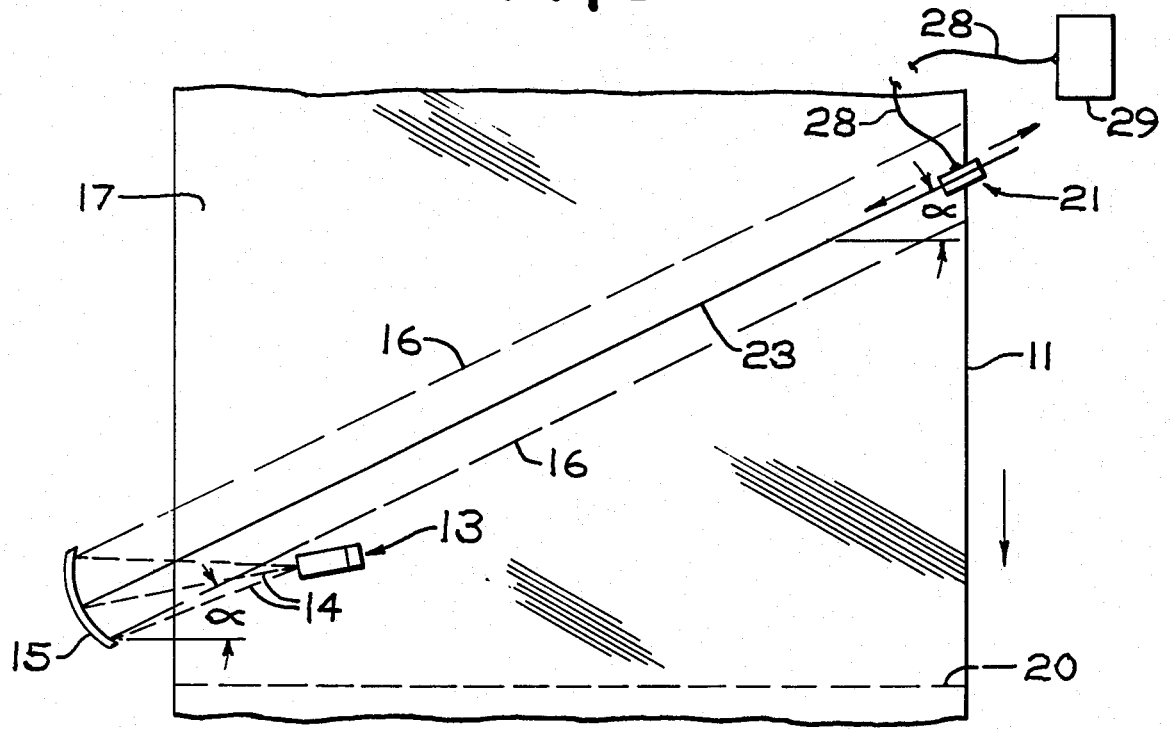
FIG. 2 is a plan view of the apparatus of FIG. 1.

Referring to the drawing, and specifically to FIGS. 1 and 2, the method of this invention will be practiced on a ribbon 11 of clear glass, 130 inches wide and 7/32 inch thick. The expected range of radius of curvature of concave and convex portions is 80-160 meters. The glass ribbon is moved in any well-known manner as by a conveyor (not shown) along a predetermined path from top to bottom as viewed in FIG. 2 at a speed of 180 inches per minute. A light source 13 including a tungsten halogen light and a lens systems (not shown) is placed at the focal point of a 12 inch diameter collimating mirror 15 to direct diverging beams of light 14 onto the mirror 15. The mirror reflects the diverging beams of light 14 as collimated beams of light 16 and directs the collimated beams of light 16 at an angle of incidence $\beta$ of 84½° to the top surface 17 of the glass ribbon 11, as viewed in FIG. 1. The angle of incidence of 84½° was calculated by the equation to give an $R_2/Rt_1$ of less than 0.21 for a 7/32 inch thick clear glass ribbon having an absorption coefficient of 0.125 centimeter$^{-1}$. By selecting an angle of incidence of 84½°, the intensity of the reflected beams from the bottom surface through the top surface are sufficiently minimized and variations in intensity of reflected beams 18 are caused by optical distortion in the top surface 17 and not by defects in the glass ribbon or by optical distortions in the bottom surface 19, as viewed in FIG. 1. The mirror is further angled with respect to the path of the glass ribbon to direct a beam of light at an angle $\alpha$ of 13° from a line perpendicular to the path of the glass ribbon as shown in FIG. 2. The angle $\alpha$ is not critical and as will be appreciated, is selected so that a scan path 20 (see FIG. 2) will be along a line perpendicular to the path of the glass ribbon.

A photo sensing detector 21 such as a high output Silicon Solar cell of the type sold by Edmund Scientific Company Catalog No. 30538 is advantageously mounted on a scanning bridge 23 for reciprocal movement toward and away from the mirror 15. The bridge is diagonal to the ribbon path at an angle equal to $\alpha$ and aligned with the axis of the mirror 15. The detector is spaced about 3⅛ inches from the top surface 17 of the glass ribbon 11 and is displaced toward the mirror at a speed of 880 inches per minute. The speed of the glass ribbon and the detector and the angle $\alpha$ (see FIG. 2) are selected so that the scan line 20 extends from one side of the ribbon to the other side along a line perpendicular to the glass movement path (see FIG. 2). As can be appreciated by those skilled in the art, the scan path is arbitrary and is not intended to limit the invention thereto.

The photo detector 21, as it is displaced along the bridge 23 toward the mirror 15, senses the intensity of the reflected beams of light from the top surface 17. Flat portions reflect incident collimated beams as collimated beams, whereas beams of light from concave portions in the surface converge toward a focal point and beams of light from convex portions diverge from a focal point.

When the detector 21 (see FIGS. 1 and 2) passes through reflected beams of light from a concave portion 25 (see FIG. 3), reflected beams of light 18 converge toward a focal point, thereby increasing the intensity of the reflected beams. The increase in intensity is a function of the radius of curvature of the concave portion 25. When the detector is displaced through reflected beams of light 18 from a convex portion 27 in the surface 17 (see FIG. 4), the intensity of the reflected beams 18 decreases as a function of the radius of curvature.

A signal from the detector 21 which varies directly as intensity of reflected beams vary is forwarded by way of cable 28 to a strip chart recorder 29 (shown in FIG. 2) of any well-known type which plots the intensity variations. In general, flat portions on the top surface will be displayed as straight lines, concave portions on the top surface as a curve deviating above or to the right of the straight line, and convex portions on the top surface as a curve deviating below or to the left of the straight line. The amount of deviation being related to the radius of curvature of the concave and convex portions.

As can be appreciated, by practicing the method and using the apparatus or equivalence thereof, surface flatness distribution of the glass ribbon may be determined while continuously producing the glass ribbon by one of the known glass-making processes.

What is claimed is:

1. A method of sensing concave and convex portions in a first surface of a piece of glass, wherein the piece of glass has a second surface opposite to the first surface, comprising the steps of:

directing a collimated beam of light toward the piece of glass at an oblique angle of incidence selected (1) to reflect beams of light from the first surface of the piece of glass as first reflected beams of light; (2) to transmit beams of light through the piece of glass to reflect beams of light from the second surface through the first surface as second reflected beams of light; and (3) to enhance the intensity variations of the first reflected beams of light reflected from concave and convex portions in the first surface of the piece of glass;

intercepting the first and second reflected beams of light by photosensing means positioned at a distance from the first surface approximately equal to or less than the focal length, at the selected oblique angle of incidence, of the smallest expected radii of curvature of concave portions in the first surface to differentiate between diverging beams of light from convex portions and converging beams of light from concave portions in the first surface of the piece of glass; and providing relative motion between the piece of glass and the photosensing means to monitor intensity variations of the first and second reflected beams of light wherein intensity variations sensed by the photosensing means are primarily a function of concave and convex portions in the first surface of the piece of glass.

2. The method as set forth in claim 1, wherein the angle of incidence of the collimated beam is selected such that the ratio of the fraction of incident energy of the second reflected beams of light to the fraction of incident energy of the first reflected beams of light is between 0 and 0.21.

3. An apparatus for sensing concave and convex portions in a first surface of a piece of glass wherein the piece of glass has a second surface opposite to the first surface comprising:

means for directing a collimated beam of light at an oblique angle of incidence selected (1) to reflect beams of light from the first surface of the piece of glass as first reflected beams of light; (2) to transmit beams of light through the piece of glass to reflect beams of light from the second surface through the first surface as second reflected beams of light; and (3) to enhance the intensity variations of the first reflected beams of light reflected from concave and convex portions in the first surface of the piece of glass;

photosensing means for monitoring the intensity variations of the first and second reflected beams of light mounted in the path of the first and second reflected beams of light at a distance from the first surface approximately equal to or less than the focal length, at the oblique angle of incidence, of the smallest expected radii of curvature of concave portions in the first surface wherein intensity variations sensed by photosensing means are primarily a function of concave and convex portions in the first surface of the piece of glass; and means for displacing the piece of glass and said photosensing means relative to one another to sense concave and convex portions in the first surface of the piece of glass.

4. The apparatus as set forth in claim 3, wherein said directing means positions the collimated beam of light such that the ratio of the fraction of incident energy of the second reflected beams of light to the fraction of incident energy of the first reflected beams of light is between 0 and 0.21.

5. The apparatus as set forth in claim 3 including:

means acted on by said photosensing means for recording intensity of the reflected beams of light.

* * * * *